United States Patent [19]
Sano et al.

[11] Patent Number: 6,111,980
[45] Date of Patent: Aug. 29, 2000

[54] METHOD FOR CORRECTING LUMINANCE GRADATION IN AN IMAGE PICKUP APPARATUS

[75] Inventors: Toshiyuki Sano, Yokohama; Keiji Toyoda, Hamamatsu, both of Japan

[73] Assignee: Matsushita Electric Industrial Co., Ltd., Osaka, Japan

[21] Appl. No.: 09/042,628

[22] Filed: Mar. 17, 1998

[30] Foreign Application Priority Data

Mar. 18, 1997 [JP] Japan ...................................... 9-083422

[51] Int. Cl.$^7$ ....................................................... G06K 9/00
[52] U.S. Cl. ......................... 382/167; 382/168; 382/169; 358/221; 358/222
[58] Field of Search ..................................... 382/162, 167, 382/168, 169, 274; 358/518, 520, 521, 522

[56] References Cited

U.S. PATENT DOCUMENTS

| | | |
|---|---|---|
| 4,734,776 | 3/1988 | Wang et al. . |
| 5,517,333 | 5/1996 | Tamura et al. . |
| 5,668,890 | 9/1997 | Winkelman ............................ 382/167 |

FOREIGN PATENT DOCUMENTS

| | | |
|---|---|---|
| 0 516 084 | 12/1992 | European Pat. Off. . |
| 0 548 781 | 6/1993 | European Pat. Off. . |
| 0 784 399 | 7/1997 | European Pat. Off. . |
| 61-57759 | 4/1986 | Japan . |
| 566751 | 3/1993 | Japan . |
| 05103256 | 4/1993 | Japan . |
| 5176263 | 7/1993 | Japan . |
| 06189182 | 7/1994 | Japan . |
| 06189183 | 7/1994 | Japan . |
| 715690 | 1/1995 | Japan . |
| 09037145 | 2/1997 | Japan . |
| 09149317 | 6/1997 | Japan . |

*Primary Examiner*—Phuoc Tran
*Attorney, Agent, or Firm*—Lowe Hauptman Gopstein Gilman & Berner

[57] ABSTRACT

A synthesized picture signal of a dynamic image is produced by combining a long-time picture signal representing a low luminance and a short-time picture signal representing a high luminance, pieces of histogram data corresponding to a plurality of luminance levels are detected from the synthesized picture signal, a sum of values of pieces of histogram data is repeatedly calculated as a summed value of a piece of summed histogram data while the number of pieces of histogram data is increased, and an inclination of a line indicated by a series of summed values is detected as a luminance gradation characteristic. Thereafter, the luminance gradation characteristic is corrected to a corrected luminance gradation characteristic according to a relationship between a maximum luminance level and an upper limit luminance level of a dynamic range, and a luminance gradation corrected signal composed of the pieces of histogram data corresponding to gradation corrected luminance levels is produced according to the corrected luminance gradation characteristic to make a maximum gradation corrected luminance level equal to or lower than the upper limit luminance level. Therefore, a low luminance object and/or a high luminance object can be clearly reproduced within the dynamic range.

14 Claims, 10 Drawing Sheets

METHOD FOR CORRECTING LUMINANCE GRADATION IN AN IMAGE PICKUP APPARATUS

BACKGROUND OF THE INVENTION

1. Field of the Invention

The present invention relates generally to a luminance gradation correcting method in an image pickup apparatus used for a video camera or the like, and more particularly to a luminance gradation correcting method for reproducing a dynamic image of an object composed of a light object portion and/or a dark object portion at a natural feeling even though a dynamic range of a displaying unit of an image pickup apparatus for luminance is narrow.

2. Description of the Related Art

In a single-plate type color camera, a ratio of the highest reproducible luminance and the lowest reproducible luminance is two or three, so that a dynamic range of the single-plate type color camera is about two or three times. However, because the luminance in an outdoor place is about 50000 lux on a sunny day and the luminance in a room is about 500 lux, so that a dynamic range of about 100 times is required for the single-plate type color camera in cases where a light object portion placed in the sunny outdoor place and a dark object portion placed in a room are simultaneously photographed. To photograph a particular object composed of a light object portion and a dark object portion as a dynamic image by using an image pickup apparatus of a narrow dynamic range, a new charge coupled device (CCD) operated at a transmission speed two times as fast as that in a conventional CCD is provided for the image pickup apparatus, a first picture signal (called a long-time picture signal) is obtained by photographing the particular object at a long exposure time (for example, about 1/60 second which is the same as that in an image pickup apparatus with the conventional CCD), a second picture signal (called a short-time picture signal) is obtained by photographing the particular object at a short exposure time (for example, about 1/1000 second), the long-time picture signal and the short-time picture signal are combined to produce a synthesized picture signal for each field period, and a luminance gradation in the synthesized picture signal is corrected to make a corrected luminance of an image reproduced by the synthesized picture signal correspond to an actual luminance of the particular object and to set the corrected luminance of the reproduced image within the narrow dynamic range of the image pickup apparatus. In this case, an image of the dark object portion is clearly indicated by the long-time picture signal though an image of the light object portion is not clearly indicated by the long-time picture signal, and an image of the light object portion is clearly indicated by the short-time picture signal though an image of the dark object portion is not clearly indicated by the short-time picture signal, Therefore, even though the dynamic range of the image pickup apparatus with the new CCD is narrow, the dark object portion and the light object portion in the particular object can be clearly indicated by the synthesized picture signal in cases where the luminance gradation in the synthesized picture signal is properly corrected.

2.1. Previously Proposed Art

An image pickup apparatus operated according to a conventional luminance gradation correcting method is described with reference to FIG. 1.

Figure 1:
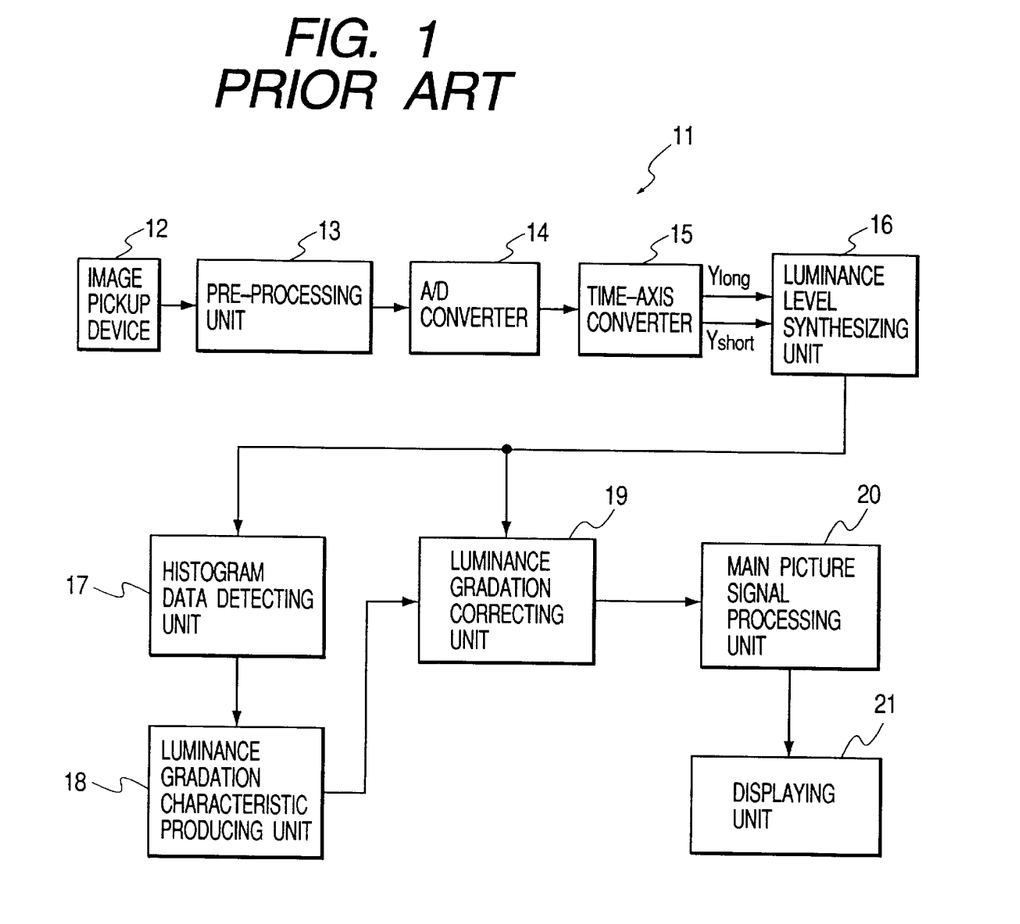
FIG. 1 is a block diagram of an image pickup apparatus operated according to a conventional luminance gradation correcting method.

FIG. 1 is a block diagram of an image pickup apparatus operated according to a conventional luminance gradation correcting method.

As shown in FIG. 1, an image pickup apparatus 11 is composed of an image pickup device 12 having M*N pixels (M pixels in the lateral direction and N pixels in the longitudinal direction) for producing a long-time analog picture signal corresponding to a long exposure time and a short-time analog picture signal corresponding to a short exposure time by alternately performing the photographing of a particular object composed of a light object portion and a dark object portion at a long exposure time and the photographing of the particular object at a short exposure time and transmitting the long-time analog picture signal and the short-time analog picture signal in a pair for each field period;

a pre-processing unit 13 for performing a correlated double sampling and a automatic gain control for the long-time analog picture signal and the short-time analog picture signal and amplifying the long-time analog picture signal and the short-time analog picture signal for each field period;

an analog-digital (A/D) converter 14 for converting the long-time analog picture signal and the short-time analog picture signal into a long-time digital picture signal and a short-time digital picture signal for each field period;

a time-axis converter 15 for producing the long-time digital picture signal and the short-time digital picture signal of which transmission time periods (or time axes) agree with each other by alternately storing the long-time digital picture signal and the short-time digital picture signal in a long-time signal memory and a short-time signal memory for each field period and simultaneously reading out the long-time digital picture signal and the short-time digital picture signal from the signal memories;

a luminance level synthesizing unit 16 for combining the long-time digital picture signal and the short-time digital picture signal to produce a synthesized picture signal having a luminance range, luminance values of the pixels in the luminance range being classified into 16 luminance levels L(i) (i=0 to 15), the 16 luminance levels being determined by equally dividing the luminance range into 16 divided luminance ranges, each luminance level representing luminance values of one divided luminance range having the same divided luminance width Lw, and the synthesized picture signal being classified into 16 pieces of histogram data of values H(i) corresponding to the 16 luminance levels;

a histogram data detecting unit 17 for detecting the values H(i) of the pieces of histogram data, the value H(i) of each piece of histogram data indicating the number of pixels having one luminance level, and the number of pixels having one luminance level being called a luminance frequency;

a luminance gradation characteristic producing unit 18, realized by a microcomputer, for normalizing the values H(i) of the pieces of histogram data to produce values Hn1(i) of pieces of normalized histogram data, replacing the values Hn1(i) with values Hn2(i) of pieces of limited histogram data to limit an inclination of a curved line indicated by a series of summed values Hns1(j)=$\Sigma$Hn1(i) (i=0 to j, j=0 to 15), summing up the values Hn2(0), Hn2(1),—and Hn2(j) to produce a plurality of summed values Hns2(j)=$\Sigma$Hn2(i) of pieces of summed histogram data and performing a normalization processing for the pieces of summed histogram data to produce pieces of summed normalized histogram data having values Hnsn (j), an inclination of a curved line indicated by a series of summed values Hnsn(j) of the pieces of summed normalized histogram data denoting a luminance gradation characteristic of a synthesized image indicated by the synthesized picture signal;

a luminance gradation correcting unit 19 for correcting a luminance gradation of the synthesized image indicated by the synthesized picture signal according to the luminance gradation characteristic to emphasize a luminance contrast between a particular luminance level of a high luminance frequency and a group of neighboring luminance levels adjacent to the particular luminance level and producing a luminance gradation corrected picture signal, the luminance gradation corrected picture signal being classified into 16 pieces of gradation corrected histogram data of values H(i) corresponding to 16 gradation corrected luminance levels;

a main picture signal processing unit 20 for processing the luminance gradation corrected picture signal to produce a luminance gradation corrected video signal;

a displaying unit 21 for reproducing a gradation corrected image of the particular object according to the luminance gradation corrected video signal, a ratio of the highest corrected luminance level to the lowest corrected luminance level being within a narrow dynamic range of the displaying unit 21.

In the above configuration, the image pickup device 12 is made of a CCD operated at a transmission speed two times as fast as that in a normal CCD, a particular object portion composed of a light object portion and a dark object portion is photographed by the image pickup device 12 at a long exposure time (1/64 second) to produce a long-time analog picture signal, and the particular object is photographed at a short exposure time (1/1000 second) to produce a short-time analog picture signal. The long-time analog picture signal and the short-time analog picture signal are alternately produced in the image pickup device 12, and the long-time analog picture signal and the short-time analog picture signal are transmitted in a pair for each field period. Thereafter, the long-time analog picture signal and the short-time analog picture signal are processed in the pre-processing unit 13 and are converted into a long-time digital picture signal and a short-time digital picture signal in the analog-digital converter 14. Thereafter, the transmission timing of the long-time digital picture signal is made agree with that of the short-time digital picture signal in the time-axis converter and the long-time digital picture signal and the short-time digital picture signal transmitted at the same time are combined to produce a synthesized picture signal in the luminance level synthesizing unit 16.

Figure 2:
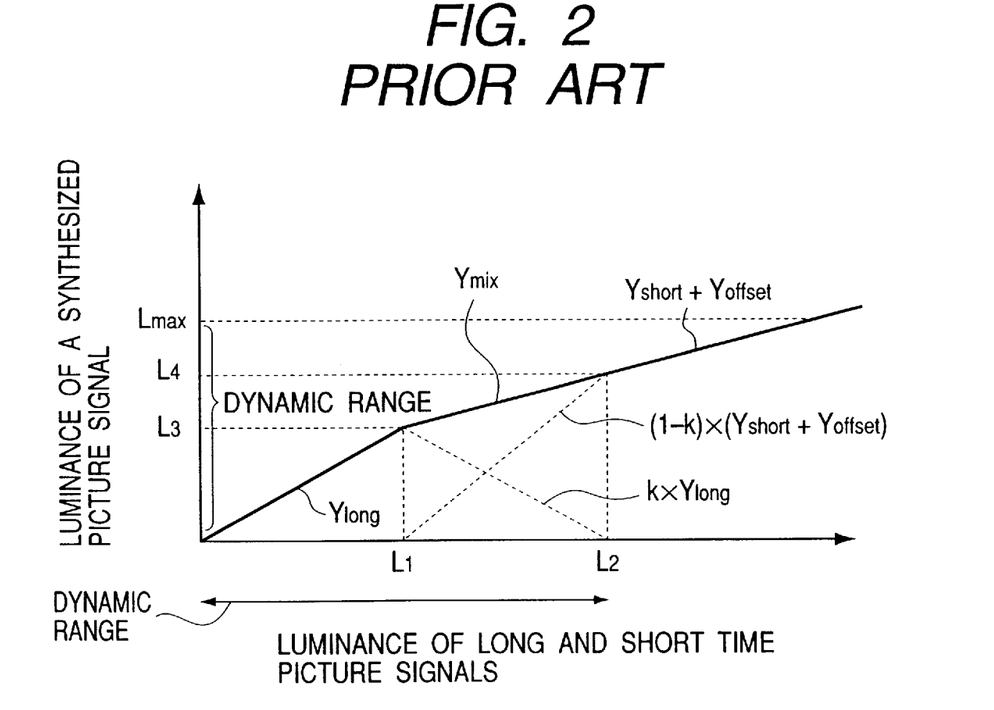
FIG. 2 shows a combining method for producing a synthesized picture signal from a long-time digital picture signal and a short-time digital picture signal.

FIG. 2 shows a combining method for producing one synthesized picture signal from one long-time digital picture signal and one short-time digital picture signal.

In FIG. 2, an X-axis indicates a luminance value of the long-time digital picture signal for each low luminance pixel and a luminance value of the short-time digital picture signal for each high luminance pixel, and a Y-axis indicates a luminance value of a synthesized picture signal at the corresponding pixel. A low luminance combination level L1 corresponding to the long-time digital picture signal and an upper luminance combination level L2 corresponding to the short-time digital picture signal are set, the long-time digital picture signal is adopted as the synthesized picture signal for pixels having luminance values equal to or lower than the low luminance combination level L1 because an image of a dark object portion can be reproduced well by the long-time digital picture signal even though the dark object portion is photographed at a long exposure time, and the short-time digital picture signal is used for pixels having luminance values equal to or higher than the upper luminance combination level L2 because an image of a light object portion can be reproduced well by the short-time digital picture signal even though the light object portion is photographed at a short exposure time.

Because the short-time digital picture signal is produced at an exposure time shorter than that in the long-time digital picture signal, a luminance value Yshort of the short-time digital picture signal at one pixel is lower than a luminance value Ylong of the long-time digital picture signal at the same pixel, so that an offset value Yoffset is added to a luminance value Yshort of the short-time digital picture signal for each pixel. Therefore, luminance values of the synthesized picture signal for pixels having luminance values equal to or lower than the low combination level L1 are expressed by Ylong, and luminance values of the synthesized picture signal for pixels having luminance values equal to or higher than the upper combination level L2 are expressed by Yshort+Yoffset. A low synthesized luminance level L3 of the synthesized picture signal corresponds to the low luminance combination level L1 of the long-time digital picture signal, and an upper synthesized luminance level L4 of the synthesized picture signal corresponds to the upper luminance combination level L2 of the short-time digital picture signal. The low synthesized luminance level L3 is usually set to half an upper limit luminance value Lmax of the dynamic range of the displaying unit 21.

Also, a gain K linearly changing in a transition luminance range between the levels L1 and L2 is used on condition that the K=1 is satisfied at the low combination level L1 and K=0 is satisfied at the upper combination level L2, and luminance values of the synthesized picture signal for pixels in the transition luminance range are expressed by K*Ylong+(1−K)*(Yshort+Yoffset). Therefore, the influence of the short-time digital picture signal is increased in the synthesized picture signal as the luminance value is increased in the transition luminance range.

Therefore, a luminance value Ymix of the synthesized picture signal is determined for each pixel.

Because the synthesized picture signal has a plurality of luminance values corresponding to the M*N pixels, in cases where the luminance values are equally classified into 16 luminance levels, 16 pieces of histogram data of values H(i) (i=0 to 15) corresponding to the 16 luminance levels can be obtained. In this case, the value H(i) of each piece of histogram data indicates the number of pixels having one luminance level and is called luminance frequency. Also, because the synthesized picture signal for pixels having luminance values equal to or higher than the upper combination level L2 has the luminance values Yshort+Yoffset higher than the luminance values Yshort, the highest luminance level L(15) exceeds an upper limit luminance value of the dynamic range of the displaying unit 21, so that a ratio of the highest luminance level to the lowest luminance level in the synthesized picture signal exceeds a dynamic range of the displaying unit 21.

Thereafter, the values H(i) of the pieces of histogram data are detected by the histogram data detecting unit 17, and a luminance gradation characteristic of a synthesized image indicated by the synthesized picture signal is produced by the luminance gradation characteristic producing unit 18.

Figure 3:
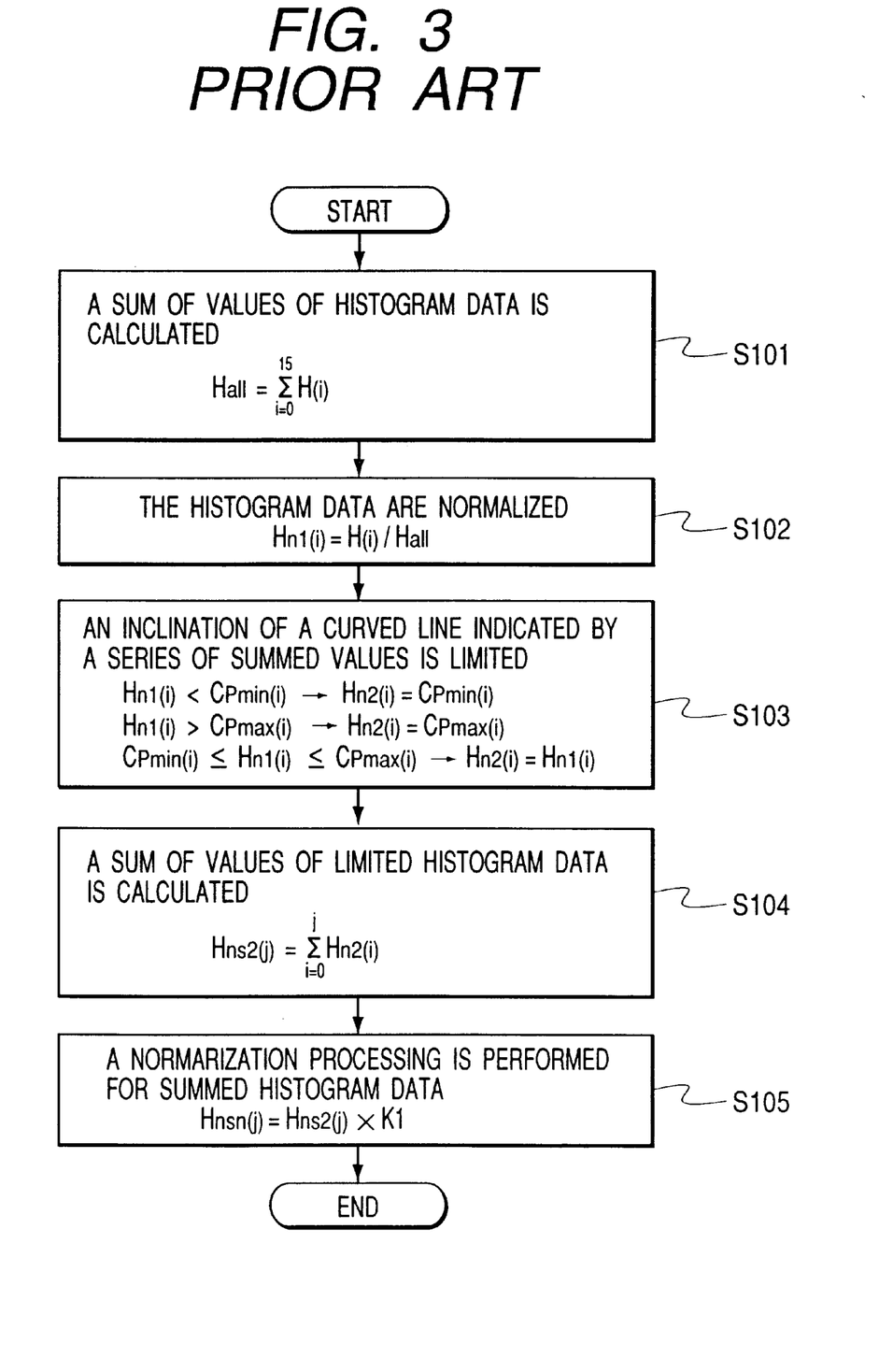
FIG. 3 shows a flow chart of a method for producing a luminance gradation characteristic of a synthesized image indicated by the synthesized picture signal according to the conventional luminance gradation correcting method.

FIG. 3 shows a flow chart of a method for producing a luminance gradation characteristic of a synthesized image indicated by the synthesized picture signal.

As shown in FIG. 3, a sum Hall of the values H(i) of the pieces of histogram data is calculated in a step S101.

$$Hall = \sum_{i=0}^{15} H(i)$$

Thereafter, the pieces of histogram data are normalized to produce values Hn1(i) of pieces of normalized histogram data in a step S102.

*Hn1(i)=H(n)/Hall*

Thereafter, assuming that a plurality of summed values Hns1(j)=ΣHn1(i) (j=0 to 15) are produced from the normalized histogram data as a luminance gradation characteristic and a luminance contrast of the synthesized image indicated by the synthesized picture signal is emphasized according to the luminance gradation characteristic, a slight difference between luminance levels of high luminance frequencies is excessively emphasized, so that a signal to noise (S/N) ratio deteriorates or a luminance contrast between luminance levels of low luminance frequencies is lost. To prevent this drawback, an inclination of a curved line indicated by a series of summed values Hns1(j) is limited. That is, in a step S103, in cases where one value Hn1(i) of the normalized histogram data is lower than a low limitation value Cpmin (i), a value Hn2(i) of a piece of limited histogram data corresponding to the value Hn1(i) is set to the low limitation value Cpmin(i). Also, in cases where one value Hn1(i) of the normalized histogram data is higher than an upper limitation value Cpmax(i), a value Hn2(i) of a piece of limited histogram data corresponding to the value Hn1(i) is set to the upper limitation value Cpmax(i). Also, in cases where one value Hn1(i) of the normalized histogram data is ranged between the limit values Cpmin(i) and Cpmax(i), the value Hn1(i) is used as a value Hn2(i) of a piece of limited histogram data.

Thereafter, in a step S104, a sum of the values Hn2(0), Hn1(1),—and Hn1(j) of the pieces of limited histogram data is calculated for each variable value j (j=0 to 15).

$$Hns2(j) = \sum_{i=0}^{j} Hn2(i)$$

Therefore, a plurality of summed values Hns2(j) of pieces of summed histogram data are obtained. Thereafter, because the highest luminance level L(15) of the synthesized picture signal exceeds an upper limit luminance value of the dynamic range of the displaying unit 21, a normalization processing is performed for the pieces of summed histogram data in a step S105 by multiplying the value of each pieces of summed histogram data by a constant value K1 to make the highest luminance level L(15) of the synthesized picture signal agree with an upper limit luminance value Lmax of the dynamic range of the displaying unit 21.

*Hnsn(j)=Hns2(j)\*K1*

*K1=Lmax/Hns2(15)*

Therefore, a plurality of summed values Hnsn(j) of pieces of summed normalized histogram data are obtained. In this case, an inclination of a curved line indicated by the series of summed values Hnsn(j) of the pieces of summed normalized histogram data denotes a luminance gradation characteristic of a synthesized image indicated by the synthesized picture signal, so that the curved line is called a luminance gradation characteristic line.

Thereafter, in the luminance gradation correcting unit 19, 16 gradation corrected luminance levels Lc(i) corresponding to pieces of gradation corrected histogram data of a luminance gradation corrected picture signal are produced from the pieces of summed normalized histogram data.

*Lc(i)=Hnsn(i)*

In this case, because the inclination of the luminance gradation characteristic line is adjusted by the value K1, the highest gradation corrected luminance level Lc(15) agrees with the upper limit luminance value Lmax of the dynamic range of the displaying unit 21 to set a ratio of the highest gradation corrected luminance level Lc(15) to the lowest gradation corrected luminance level Lc(0) within the dynamic range of the displaying unit 21.

Thereafter, a luminance gradation corrected picture signal, in which each piece of gradation corrected histogram data of the value H(i) corresponds to the gradation corrected luminance level Lc(i), is produced. Therefore, because a gradation corrected luminance level corresponding to a high luminance frequency represents a divided luminance range having a wide luminance width, a luminance contrast between a particular luminance level of a high luminance frequency and a group of neighboring luminance levels adjacent to the particular luminance level is emphasized in a luminance gradation corrected image indicated by the luminance gradation corrected picture signal.

Thereafter, the luminance gradation corrected picture signal is processed in the main picture signal processing unit 20, and a gradation corrected image of the particular object is reproduced in the displaying unit 21 on condition that a ratio of the highest gradation corrected luminance level to the lowest gradation corrected luminance level is within a narrow dynamic range of the displaying unit 21.

Accordingly, a luminance contrast of a particular luminance level, in which a large number of pixels exist, for other luminance levels can be emphasized according to a conventional luminance gradation correcting method. Also, the highest gradation corrected luminance level Lc(15) agrees with an upper limit luminance value of the dynamic range of the displaying unit 21 according to a conventional luminance gradation correcting method to prevent that the luminance values of the luminance gradation corrected picture signal exceeds the narrow dynamic range of the displaying unit 21.

2.2. Problems to be Solved by the Invention:

However, even though a low-luminance object such as a dark object is only photographed by the image pickup apparatus 11 and the highest luminance level of a synthesized picture signal indicating the dark object does not exceed an upper limit luminance value of the dynamic range of the displaying unit 21, the luminance levels of the synthesized picture signal are unnecessarily adjusted to make the highest luminance level of the synthesized picture signal agree with the upper limit luminance value of the dynamic range of the displaying unit 21. Therefore, there is a drawback that the user views a luminance gradation corrected image of the dark object at an unnatural feeling.

SUMMARY OF THE INVENTION

An object of the present invention is to provide, with due consideration to the drawbacks of such a conventional luminance gradation correcting method, a luminance gradation correcting method in which an image viewed by a user at a natural feeling is reproduced even though the image is obtained by photographing a low-luminance object such as a dark object with an image pickup apparatus having a narrow dynamic range.

The object of the present invention is achieved by the provision of a luminance gradation correcting method in an image pickup apparatus having a dynamic range, comprising the steps of:

detecting pieces of histogram data respectively indicating the number of pixels of a luminance level from an input picture signal produced in the image pickup apparatus, the input picture signal indicating a particular image;

detecting a maximum luminance level from the luminance levels of the pieces of histogram data;

detecting a luminance gradation characteristic of the particular image indicated by the input picture signal from the pieces of histogram data corresponding to the luminance levels;

producing a corrected luminance gradation characteristic of the particular image from the luminance gradation characteristic of the particular image according to the maximum luminance level and the dynamic range of the image pickup apparatus;

correcting the luminance levels of the pieces of histogram data to a plurality of gradation corrected luminance levels according to the corrected luminance gradation characteristic of the particular image to set the gradation corrected luminance levels corresponding to the pieces of histogram data within the dynamic range of the image pickup apparatus; and     producing a luminance gradation corrected picture signal composed of the pieces of histogram data corresponding to the gradation corrected luminance levels to reproduce the particular image, in which each of the pixels has one corresponding gradation corrected luminance level, from the luminance gradation corrected picture signal.

In the above steps, after pieces of histogram data are detected from an input picture signal, a maximum luminance level is detected from among the luminance levels, and a luminance gradation characteristic of the particular image is detected from the pieces of histogram data. A value of the piece of histogram data corresponding to the maximum luminance level is not equal to zero. Also, the luminance gradation characteristic denotes an inclination of a line indicated by a series of summed values of pieces of summed histogram data, and the summed values of the pieces of summed histogram data are determined by repeatedly calculating a sum of values of pieces of histogram data while the number of pieces of histogram data is increased one by one.

Thereafter, a corrected luminance gradation characteristic of the particular image is produced from the luminance gradation characteristic of the particular image, and the luminance levels are corrected to a plurality of gradation corrected luminance levels according to the corrected luminance gradation characteristic. In this case, when the maximum luminance level is lower than or equal to a standard luminance level, the luminance levels are the same as the gradation corrected luminance levels. That is, any luminance gradation correction is not performed. When the maximum luminance level is higher than the standard luminance level and is lower than or equal to an upper limit luminance value of the dynamic range, the corrected luminance gradation characteristic is set to make a maximum-gradation corrected luminance level agree with the maximum luminance level. When the maximum luminance level is higher than the upper limit luminance value of the dynamic range, the corrected luminance gradation characteristic is set to make a maximum gradation corrected luminance level agree with the upper limit luminance value.

Thereafter, a luminance gradation corrected picture signal composed of the pieces of histogram data corresponding to the gradation corrected luminance levels is produced, and the particular image, in which each of the pixels has one corresponding gradation corrected luminance level, is reproduced from the luminance gradation corrected picture signal.

Accordingly, even though the input picture signal is obtained by photographing a particular object such as a dark object of a low luminance, a light object of a high luminance or a combined object composed of a dark object portion and a light object portion, the particular image of the input picture signal can be viewed by a user at a natural feeling.

BRIEF DESCRIPTION OF THE DRAWINGS

The objects, features and advantages of the present invention will be apparent from the following description taken in conjunction with the accompanying drawings, in which.

DETAILED DESCRIPTION OF THE EMBODIMENTS

Preferred embodiments of a luminance gradation correcting method according to the present invention are described with reference to the drawings.

Figure 4:
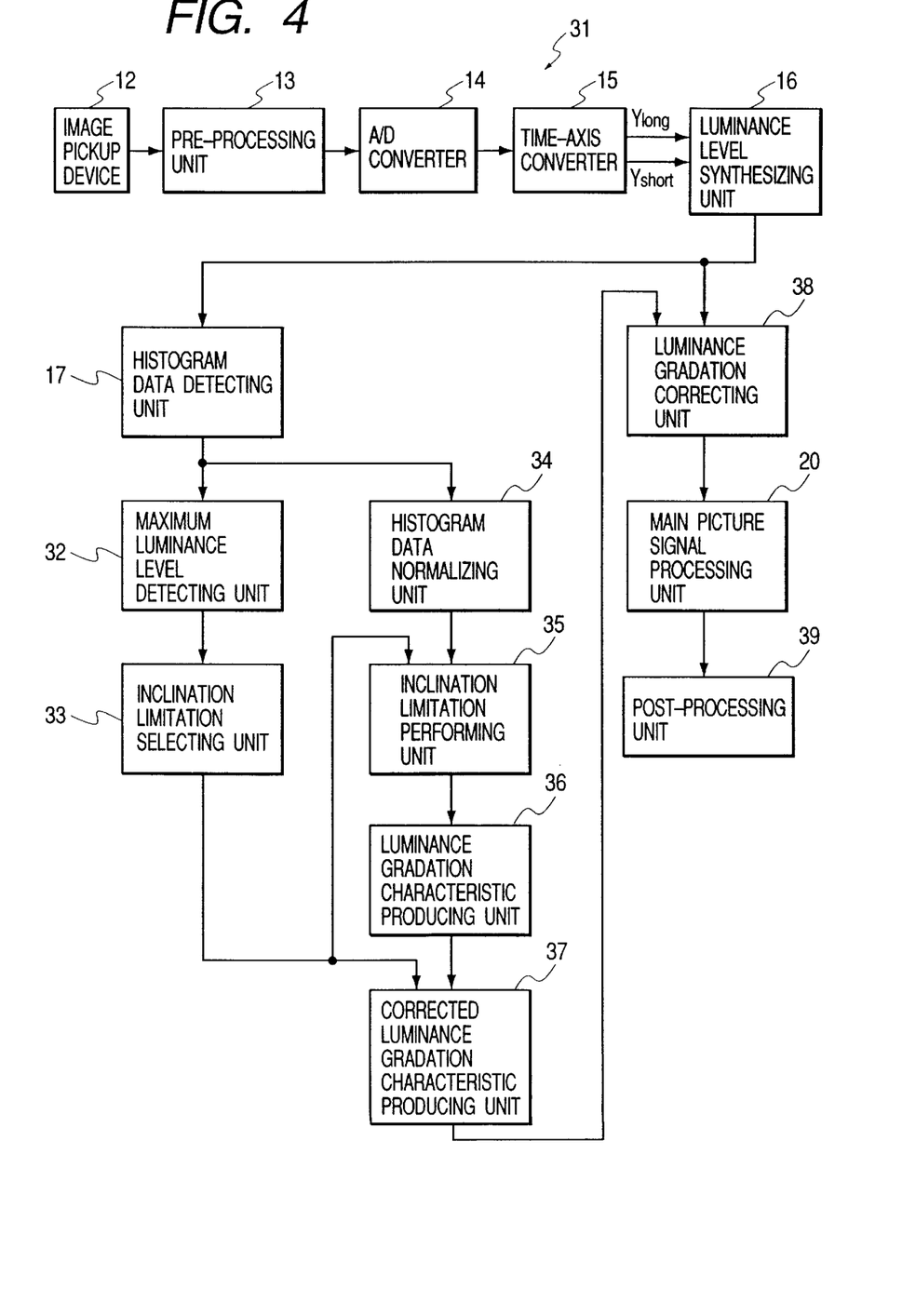
FIG. 4 is a block diagram of an image pickup apparatus operated according to a luminance gradation correcting method of the present invention.
Figure 5:
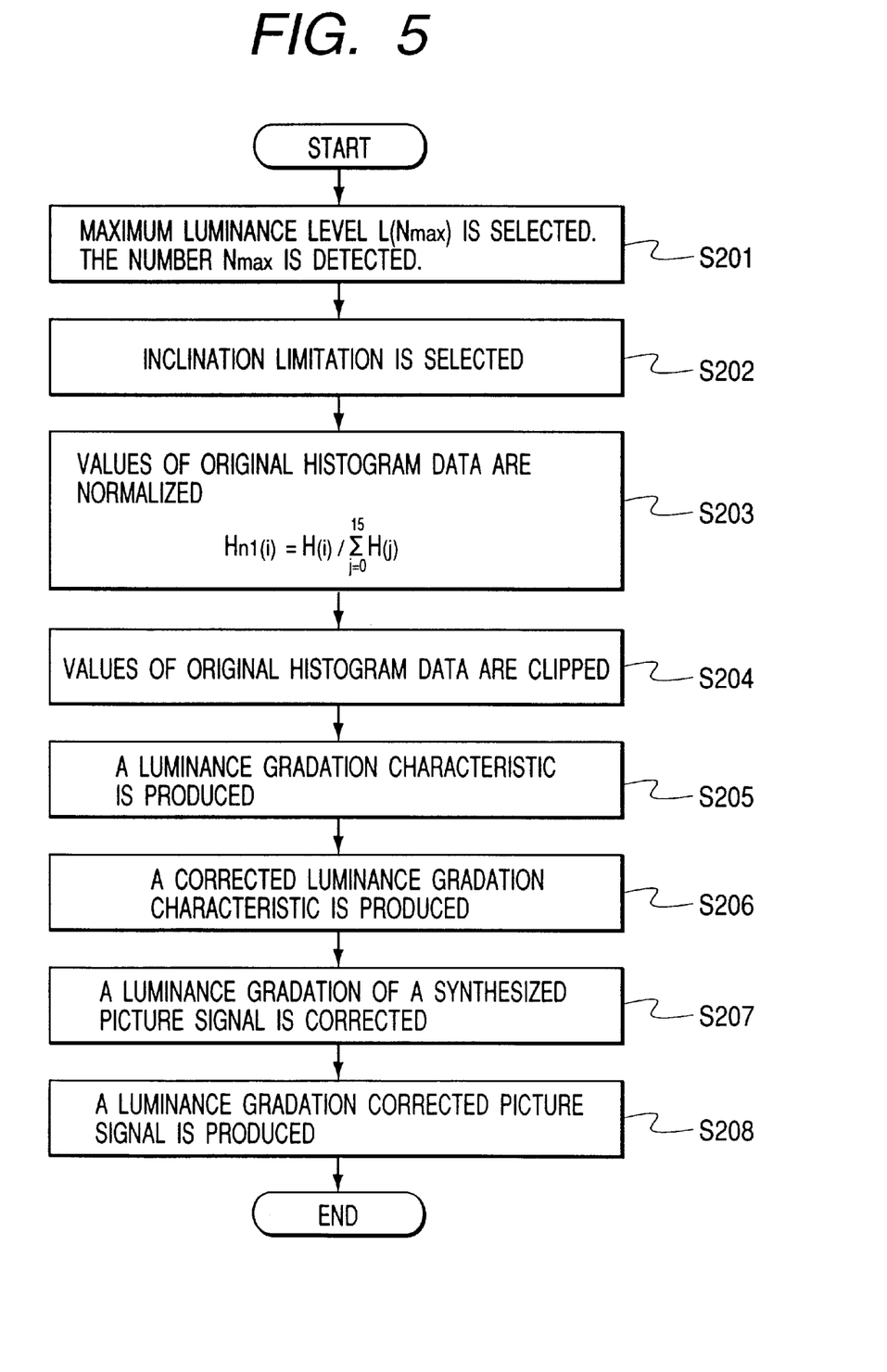
FIG. 5 shows a flow chart of a method for performing a luminance gradation correction to change luminance levels of pieces of histogram data of the synthesized picture signal to gradation corrected luminance levels.

FIG. 4 is a block diagram of an image pickup apparatus operated according to a luminance gradation correcting method of the present invention, and FIG. 5 shows a flow chart of a method for performing a luminance gradation correction to change luminance levels of pieces of histogram data of the synthesized picture signal to gradation corrected luminance levels.

As shown in FIG. 4, an image pickup apparatus 31 comprises:

the image pickup device 12 having M*N pixels, the pre-processing unit 13, the analog-digital converter 14, the time-axis converter 15, the luminance level synthesizing unit 16, the histogram data detecting unit 17, a maximum luminance level detecting unit 32 for selecting a particular luminance levels L(i) corresponding pieces of particular histogram data having values H(i) not equal to zero from the pieces of original histogram data detected by the histogram data detecting unit 17, selecting a maximum luminance level L(Nmax) having the maximum luminance value among the particular luminance levels and detecting the number Nmax of the maximum luminance level;

an inclination limitation selecting unit 33 for selecting a first inclination limitation in cases where the maximum luminance level is lower than or equal to a standard luminance level Ls, selecting a second inclination limitation in cases where the maximum luminance level is higher than the standard luminance level Ls and is equal to or lower than an upper limit luminance value Lmax of a dynamic range of a post-processing unit 38, and selecting a third inclination limitation in cases where the maximum luminance level is higher than the upper limit luminance value Lmax of the dynamic range, the standard luminance level Ls being half the upper limit luminance value Lmax of the dynamic range;

a histogram data normalizing unit 34 for normalizing the values H(i) of the pieces of original histogram data detected by the histogram data detecting unit 17 to produce values Hn1(i) of pieces of normalized histogram data;

an inclination limitation performing unit 35 for preparing a low limitation value Cpmin(i) and an upper limitation value Cpmax(i) to satisfy Cpmin(i)=Cpmax(i) in cases where the first inclination limitation is selected, preparing a low limitation value Cpmin(i) and an upper limitation value Cpmax(i) to satisfy Cpmin(i)<Cpmax(i) in cases where the second inclination limitation or the third inclination limitation is selected, setting the value Hn1(i) of each piece of normalized histogram data to the low limitation value Cpmin(i) in case of Hn1(i)<(Cpmin(i), setting the value Hn1(i) of each piece of normalized histogram data to the upper limitation value Cpmax(i) in case of Hn1(i), Cpmax(i) and setting the value Hn1(i) of each piece of normalized histogram data as a value Hn2(i) (i=0 to Nmax) of a piece of limited histogram data, an inclination of a curved line indicated by a series of summed values Hns1(j)=ΣHn1(i) (i=0 to j) being limited in a curved line indicated by a series of summed values Hns2(j)= ΣHn2(i);

a luminance gradation characteristic producing unit 36 for accumulating the values Hn2(i) of the pieces of limited histogram data to produce summed values Hns2(j)= ΣHn2(i) (i=0 to j, j=0 to Nmax) of pieces of limited histogram data and producing a limited inclination of a line indicated by a series of summed values Hns2(j) as a luminance gradation characteristic of the synthesized picture signal;

a corrected luminance gradation characteristic producing unit 37 for multiplying each of the summed values Hns2(j) by a normalization factor K2=L(Nmax)/Hns2 (Nmax) to produce normalized summed values Hnsn2 (j)=K2*Hns2(j) in cases where the first inclination limitation or the second inclination limitation is selected, multiplying each of the summed values Hns2 (j) by a normalization factor K2=Lmax/Hns2(Nmax) to produce normalized summed values Hnsn2(j)= K2*Hns2(j) in cases where the third inclination limitation is selected, and producing a corrected inclination of a line indicated by a series of normalized summed values Hnsn2(j) as a corrected luminance gradation characteristic of a luminance gradation corrected picture signal;

a luminance gradation correcting unit 38 for setting the normalized summed values Hnsn2(j) as gradation corrected luminance values Lc(j) and producing a luminance gradation corrected picture signal classified into (Nmax+1) pieces of gradation corrected histogram data of the values H(i) corresponding to the gradation corrected luminance levels Lc(i) (i=0 to Nmax) to correct a luminance gradation of the synthesized image indicated by the synthesized picture signal to a luminance gradation indicated by the luminance gradation corrected picture signal, a luminance contrast between a particular gradation corrected luminance level Lc(n) and a group of neighboring luminance levels Lc(n−1) and Lc(n+1) adjacent to the particular luminance level being emphasized when an inclination of a line indicated by the series of summed value Hns2(n) at the luminance level L(n) is high; the main picture signal processing unit 20 for processing the luminance gradation corrected picture signal to produce a luminance gradation corrected video signal; and a post-processing unit 39 for reproducing the particular object according to the luminance gradation corrected video signal at a narrow dynamic range from the gradation corrected luminance level Lc(0) to the upper limit luminance value Lmax.

In the above configuration, after a synthesized picture signal is produced in the luminance level synthesizing unit 16, the values H(i) of the pieces of original histogram data are detected by the histogram data detecting unit 17 in the same manner as in the prior art shown in FIG. 3.

Figure 6A:
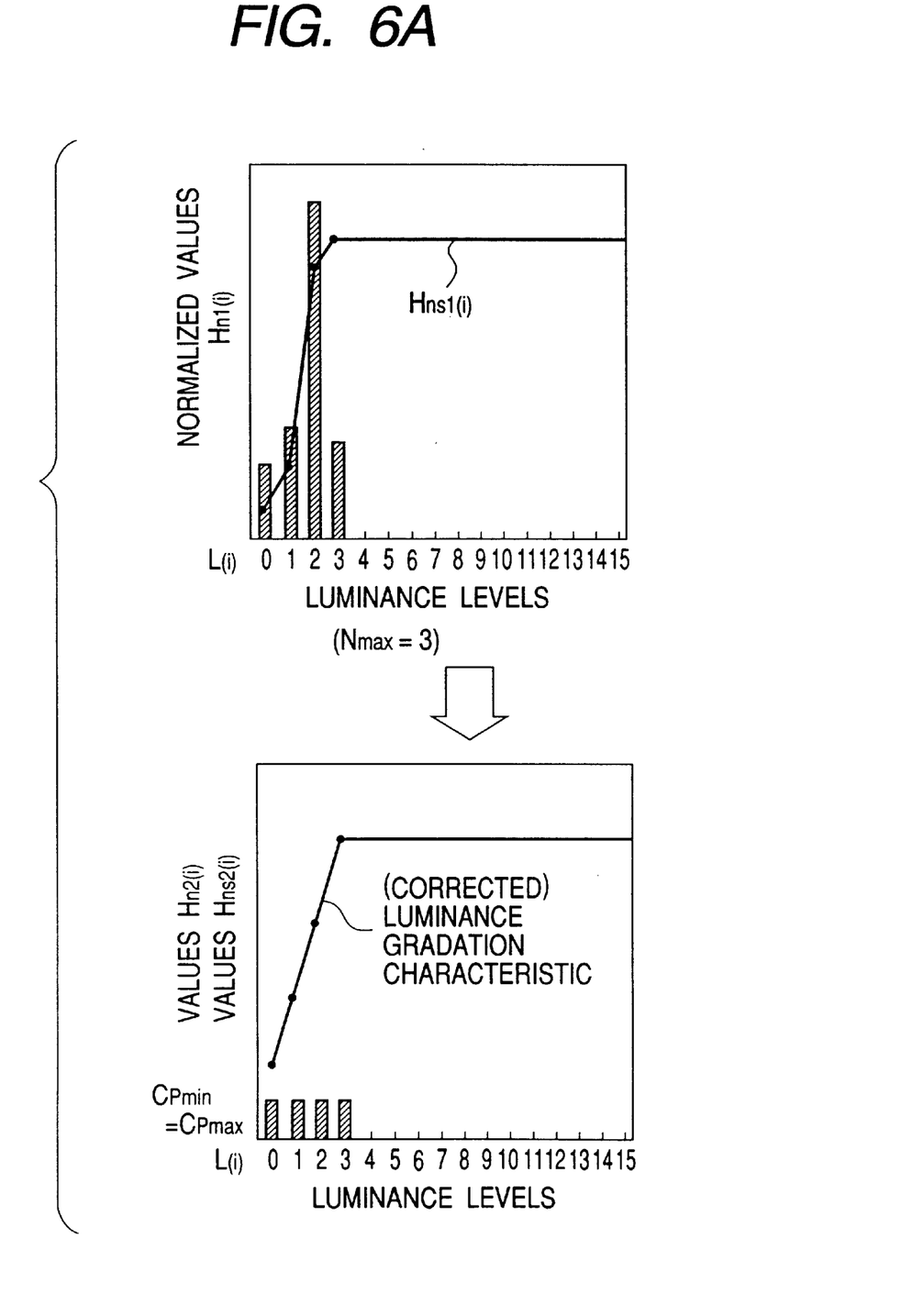
FIG. 6A shows a first example of the synthesized picture signal in which the maximum luminance level is lower than or equal to a standard luminance level equivalent to half an upper limit luminance value of a dynamic range of a post-processing unit of the image pickup apparatus shown in FIG. 4.
Figure 6B:
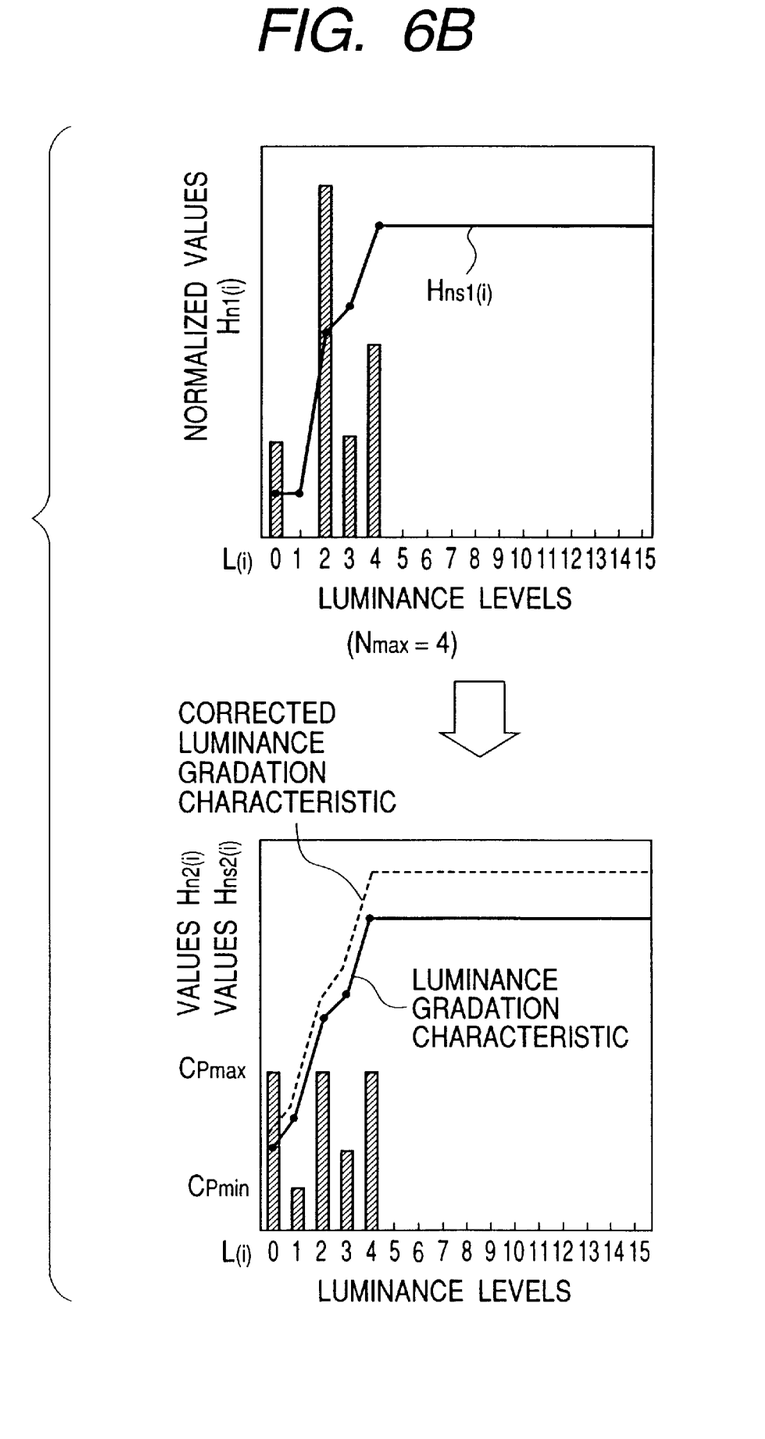
FIG. 6B shows a second example of the synthesized picture signal in which the maximum luminance level is higher than the standard luminance level and is equal to or lower than the upper limit luminance value of the dynamic range.
Figure 6C:
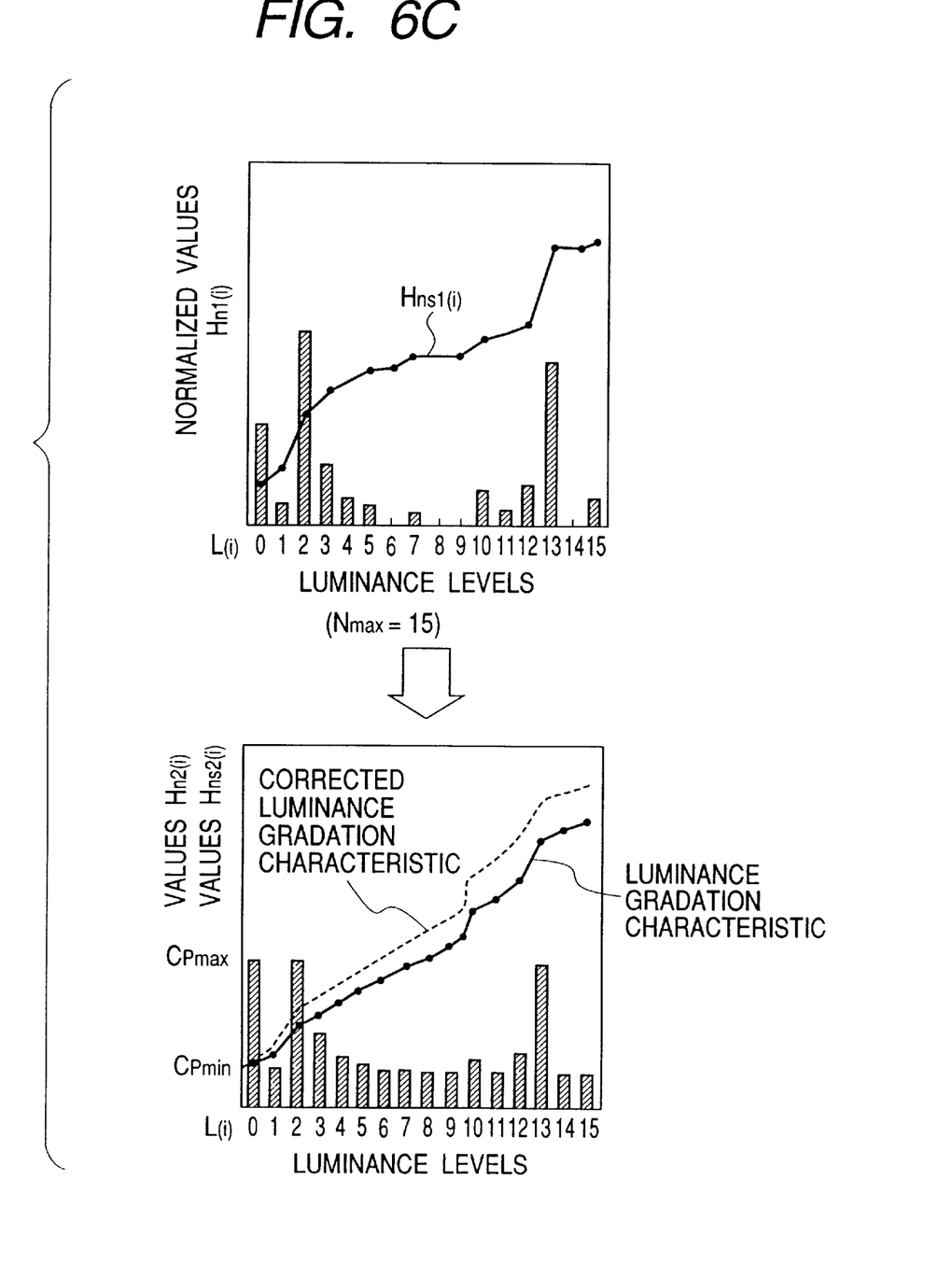
FIG. 6C shows a third example of the synthesized picture signal in which the maximum luminance level is higher than the upper limit luminance value of the dynamic range.

Thereafter, as shown in FIG. 5, in the maximum luminance level detecting unit 32, a maximum luminance level L(Nmax) having the maximum luminance value is selected from particular luminance levels corresponding to pieces of original histogram data having values H(i) not equal to zero, and the number Nmax of the maximum luminance level is detected in a step S201. For example, as shown in FIG. 6A, the maximum number Nmax of the luminance level is 3 in a first example in which a luminance value of the maximum luminance level L(Nmax) is equal to or lower than a standard luminance level Ls=L(4). The standard luminance level Ls is about half the upper limit luminance value Lmax of the dynamic range and is set to the low synthesized luminance level L3 shown in FIG. 2. Also, as shown in FIG. 6B, the maximum number Nmax of the luminance level is 4 in a second example in which a luminance value of the maximum luminance level L(Nmax) is higher than the standard luminance level Ls and is equal to or lower than an upper limit luminance value Lmax=L(5) of a dynamic range of the post-processing unit 39. Also, as shown in FIG. 6C, the maximum number Nmax of the luminance level is 15 in a third example in which a luminance value of the maximum luminance level L(Nmax) is higher than the upper limit luminance value Lmax of the dynamic range. In this embodiment, three luminance gradation correction methods performed for the above examples differ from each other.

Thereafter, an inclination limitation is selected in the inclination limitation selecting unit 33 in a step S202. In detail, a first inclination limitation is selected in cases where the maximum luminance level L(Nmax) is lower than or equal to the standard luminance level Ls, a second inclination limitation is selected in cases where the maximum luminance level L(Nmax) is higher than the standard luminance level Ls and is equal to or lower than the upper limit luminance value Lmax of the dynamic range, and a third inclination limitation is selected in cases where the maximum luminance level L(Nmax) is higher than the upper limit luminance value Lmax of the dynamic range.

Also, in a step S203, the values H(i) of the pieces of original histogram data detected by the histogram data detecting unit 17 are normalized in the histogram data normalizing unit 34 to produce values Hn1(i) of pieces of normalized histogram data in the same manner as in the step S102 of FIG. 3.

Thereafter, in a step S204, a value of original histogram data indicating an extremely large number of pixels is clipped to an upper limitation value Cpmax(i), and a value of original histogram data indicating an extremely small number of pixels is clipped to a low limitation value Cpmin(i). In this embodiment, a luminance contrast between a particular luminance level, in which the number of pixels is large, and a group of neighboring luminance levels adjacent to the particular luminance level is emphasized by widening a divided luminance width of the particular luminance level. However, in cases where a divided luminance width of the particular luminance level is extremely widened by multiplying the divided luminance width by a gain determined according to an extremely large number of pixels corresponding to the particular luminance level, a slight difference between luminance levels of high luminance frequencies is excessively emphasized, so that a signal to noise (S/N) ratio deteriorates. Also, in cases where a divided luminance width of the particular luminance level is extremely narrowed by multiplying the divided luminance width by a gain determined according to an extremely small number of pixels corresponding to the particular luminance level, a luminance contrast between luminance levels of low luminance frequencies is excessively suppressed. Therefore, an unnatural luminance gradation correction is undesirably performed.

To prevent this unnatural luminance gradation correction in the inclination limitation performing unit 35 in the step S204, a low limitation value Cpmin(i) and an upper limitation value Cpmax(i) satisfying Cpmin(i)=Cpmax(i) are prepared in case of the first inclination limitation, a low limitation value Cpmin(i) and an upper limitation value Cpmax(i) satisfying Cpmin(i)<Cpmax(i) is prepared in case of the second inclination limitation or the third inclination limitation, the value Hn1(i) of each piece of normalized histogram data is set to the low limitation value Cpmin(i) in case of Hn1(i)<Cpmin(i), the value Hn1(i) of each piece of normalized histogram data is set to the upper limitation value Cpmax(i) in case of Hn1(i)>Cpmax(i), and the value Hn1(i) of each piece of normalized histogram data is set as a value Hn2(i) (i=0 to Nmax) of a piece of limited histogram data. Therefore, as shown in FIGS. 6A to 6C, an inclination of a line indicated by a series of summed values Hns1(j)= $\Sigma$Hn1(i) (i=0 to j) is changed to a limited inclination of a line indicated by a series of summed values Hns2(j)=$\Sigma$Hn2(i). In this case, the upper limitation value Cpmax(i) indicates an upper limitation for the limited inclination, and the low limitation value Cpmin(i) indicates a low limitation for the limited inclination.

For example, the limitation values Cpmin(i) and Cpmax (i) are set to 32 for Nmax=511 in case of the first inclination limitation. In case of the second inclination limitation, the low limitation value Cpmin(i) is set to 32 (i=0,1) and 16 (i$\geq$2) for Nmax=511, and the upper limitation value Cpmax (i) are set to 32 (i$\leq$4) and 16 (i$\geq$5) for Nmax=511. In case of the third inclination limitation, the low limitation value Cpmin (i) is set to 32 (i=0, i$\geq$5) and 8 (1$\leq$i$\leq$4) for Nmax=511, and the upper limitation value Cpmax(i) are set to 32 (i$\leq$4) and 64 (i$\geq$5) for Nmax=511. However, in FIGS. 6A to 6C, the limitation value Cpmin(i) is constant for all luminance levels L(i), and the limitation value Cpmax(i) is constant for all luminance levels L(i) for convenience.

Thereafter, in a step S205, a luminance gradation characteristic of the pieces of limited histogram data is produced in the histogram data characteristic producing unit 36. That is, the values Hn2(i) of the pieces of limited histogram data are accumulated to produce summed values Hns2 (j).

$$Hns2(j) = \sum_{i=0}^{j} Hn2(i) \quad (j = 0 \text{ to } Nmax)$$

A limited inclination of a line indicated by a series of summed values Hns2(j) denotes the luminance gradation characteristic of the synthesized picture signal, as shown in FIGS. 6A to 6C.

Thereafter, in a step S206, a corrected luminance gradation characteristic of a luminance gradation corrected picture signal is produced in the luminance gradation characteristic producing unit 37, as shown in FIGS. 6A to 6C. That is, each of the summed values Hns2(j) is multiplied by a normalization factor K2 to make the maximum gradation corrected luminance values Lc(Nmax) agree with the maximum luminance values L (Nmax) in cases where the first inclination limitation or the second inclination limitation is selected and to make the maximum gradation corrected luminance values Lc(Nmax) agree with the upper limit luminance value Lmax of the dynamic range in cases where the third inclination limitation is selected.

Hnsn2(j)=K2*Hns2(j) (j=0 to Nmax)

K2=L(Nmax)/Hns2(Nmax) (for the first or second inclination limitation)

K2=Lmax/Hns2(Nmax) (for the third inclination limitation)

In this case, an inclination of a line indicated by a series of summed normalized values Hnsn2(j) denotes the corrected luminance gradation characteristic of a luminance gradation corrected picture signal because Hnsn2(Nmax)=L(Nmax) is satisfied for the first inclination limitation or the second inclination limitation and Hnsn2(Nmax)=Lmax is satisfied for the third inclination limitation. Also, in cases where the first inclination limitation is selected, a difference between two summed normalized values Hnsn2(j) and Hnsn2(j+1) is constant because each value Hn2(i) is equal to Cpmin(i) (or Cpmax(i)), and the value Cpmin(i) (or Cpmax(i)) is set to make the difference agree with a luminance difference between two luminance levels L(j) and L(j+1).

Thereafter, in a step S207, a luminance gradation of the synthesized image indicated by the synthesized picture signal is corrected in the luminance gradation correcting unit 38. That is, the normalized summed values Hnsn2(j) are set as gradation corrected luminance values Lc(j).

$$Lc(j)=Hnsn2(j) \ (j=0 \text{ to Nmax})$$

Thereafter, in a step S208, a luminance gradation corrected picture signal composed of (Nmax+1) pieces of gradation corrected histogram data corresponding to the gradation corrected luminance levels Lc(i) (i=0 to Nmax) is produced. A value of each gradation corrected histogram data corresponding to one gradation corrected luminance level Lc(i) is equal to the value H(i) of one histogram data corresponding to one luminance level L(i).

Therefore, when an inclination of the series of summed value Hns2(n) at a luminance level L(n) is high because a value Hn2(n) of the limited histogram data is high, a luminance contrast between a particular gradation corrected luminance level Lc(n) and a group of neighboring luminance levels Lc(n−1) and Lc(n+1) adjacent to the particular luminance level is emphasized.

In this case, when the first inclination limitation is selected, because the difference between two summed normalized values Hnsn2(j) and Hnsn2(j+1) is constant and is set to a luminance width between two luminance levels adjacent to each other, any correction of the luminance gradation is not performed. That is, in cases where the maximum luminance level L(Nmax) is lower than or equal to the standard luminance level Ls, the synthesized image indicated by the synthesized picture signal can be sufficiently reproduced in the post-processing unit 39 having a narrow dynamic range without any correction of the luminance gradation.

Also, when the second inclination limitation is selected, because the synthesized image indicated by the synthesized picture signal can be reproduced at a natural feeling in the post-processing unit 39 having a narrow dynamic range when a luminance contrast between a particular luminance level of a high luminance frequency and a group of neighboring luminance levels adjacent to the particular luminance level is emphasized, the luminance levels L(i) are changed to gradation corrected luminance levels Lc(i) on condition that the maximum gradation corrected luminance level Lc(Nmax) agrees with the maximum luminance level L(Nmax).

Also, when the third inclination limitation is selected, because a luminance range in the synthesized picture signal exceeds a dynamic range of the post-processing unit 39, it is required to narrow the luminance range of the synthesized picture signal within the dynamic range of the post-processing unit 39. Therefore, the luminance levels L(i) are changed to gradation corrected luminance levels Lc(i) on condition that the maximum gradation corrected luminance level Lc(Nmax) agrees with the upper limit luminance value Lmax of the dynamic range.

Thereafter, the luminance gradation corrected picture signal is processed in the main picture signal processing unit 20, and an image of the particular object is reproduced in the post-processing unit 39 at a narrow dynamic range.

Figure 7A:
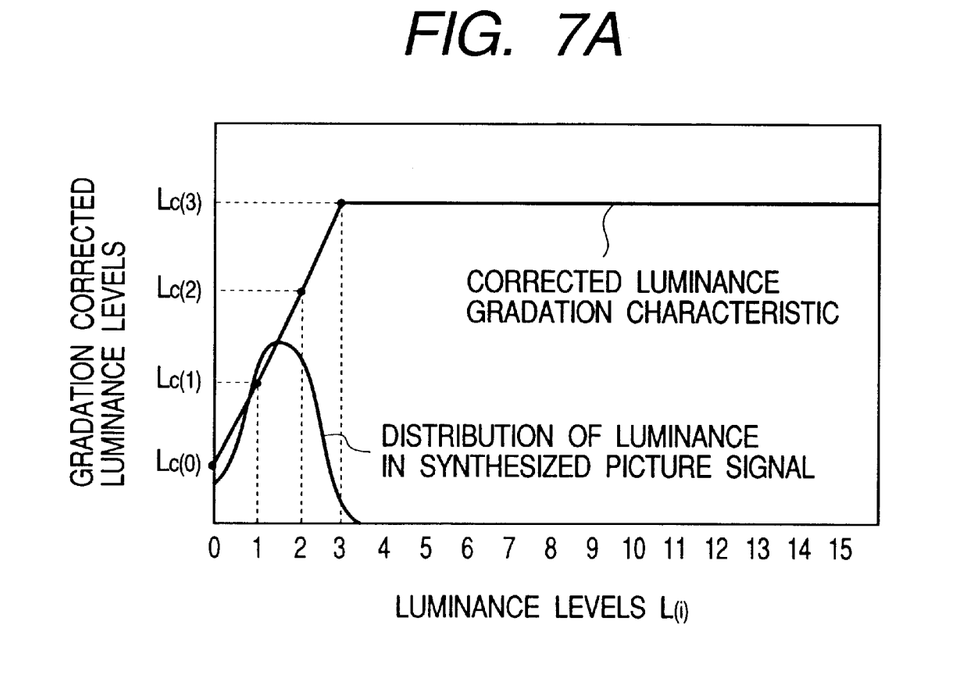
FIG. 7A shows gradation corrected luminance levels of the first example shown in FIG. 6A.
Figure 7B:
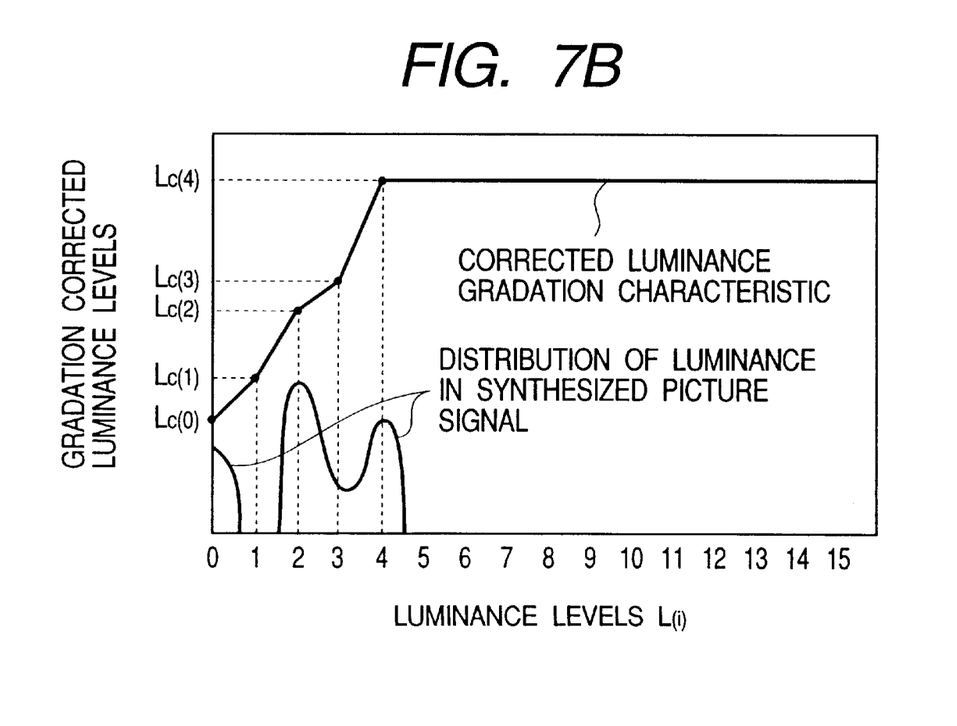
FIG. 7B shows gradation corrected luminance levels of the second example shown in FIG. 6B.
Figure 7C:
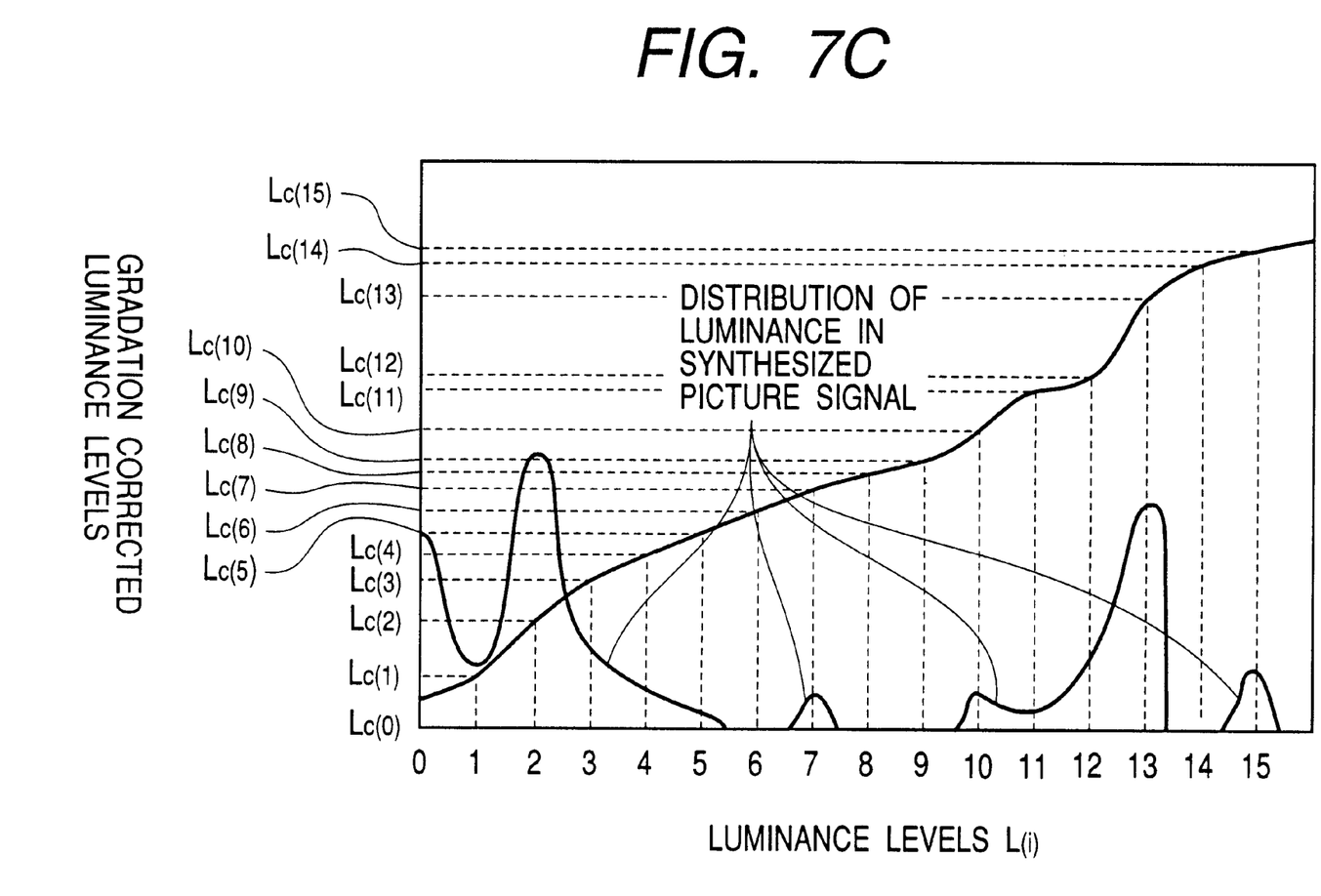
FIG. 7C shows gradation corrected luminance levels of the third example shown in FIG. 6C.

Therefore, For example, in cases where the maximum luminance level L(Nmax) is lower than or equal to the standard luminance level Ls, the luminance levels L(i) of the original histogram data of the synthesized picture signal are changed to the gradation corrected luminance level Lc(i) shown in FIG. 7A. Also, in cases where the maximum luminance level L(Nmax) is higher than the standard luminance level Ls and is equal to or lower than an upper limit luminance value of a dynamic range, the luminance levels L(i) of the original histogram data of the synthesized picture signal are changed to the gradation corrected luminance level Lc(i) shown in FIG. 7B. Also, in cases where the maximum luminance level L(Nmax) is higher than the upper limit luminance value Lmax of the dynamic range, the luminance levels L(i) of the original histogram data of the synthesized picture signal are changed to the gradation corrected luminance level Lc(i) shown in FIG.

Accordingly, even though any object such as a dark object of a low luminance, a light object of a high luminance or a dark and high object composed of a dark object portion and a light object portion is photographed, an image viewed by a user at a natural feeling can be reproduced in an image pickup apparatus having a narrow dynamic range.

Also, because the maximum gradation corrected luminance level in the luminance gradation corrected picture signal is determined according to a first relationship between the maximum luminance level of the synthesized picture signal and the standard luminance level Ls and a second relationship between the maximum luminance level and the upper limit luminance value Lmax of the dynamic range, the dynamic range of the post-processing unit can be effectively used even though any subject is photographed, an S/N ratio for an image of a low luminance portion can be improved while an image of a high luminance portion is reproduced.

Having illustrated and described the principles of the present invention in a preferred embodiment thereof, it should be readily apparent to those skilled in the art that the invention can be modified in arrangement and detail without departing from such principles. We claim all modifications coming within the scope of the accompanying claims.

What is claimed is:

1. A luminance gradation correcting method in an image pickup apparatus having a dynamic range, comprising the steps of:

detecting pieces of histogram data respectively indicating the number of pixels of a luminance level from an input picture signal produced in the image pickup apparatus, the input picture signal indicating a particular image;

detecting a maximum luminance level from the luminance levels of the pieces of histogram data;

detecting a luminance gradation characteristic of the particular image indicated by the input picture signal from the pieces of histogram data corresponding to the luminance levels;

producing a corrected luminance gradation characteristic of the particular image from the luminance gradation characteristic of the particular image according to the maximum luminance level and the dynamic range of the image pickup apparatus;

correcting the luminance levels of the pieces of histogram data to a plurality of gradation corrected luminance levels according to the corrected luminance gradation characteristic of the particular image to set the gradation corrected luminance levels corresponding to the pieces of histogram data within the dynamic range of the image pickup apparatus; and producing a luminance gradation corrected picture signal composed of the pieces of histogram data corresponding to the gradation corrected luminance levels to reproduce the particular image, in which each of the pixels has one corresponding gradation corrected luminance level, from the luminance gradation corrected picture signal.

2. A luminance gradation correcting method according to claim 1 in which the step of producing a corrected luminance gradation characteristic comprises the steps of:

setting the corrected luminance gradation characteristic to the luminance gradation characteristic in cases where the maximum luminance level is lower than or equal to a standard luminance level which is half an upper limit luminance value of the dynamic range;

setting the corrected luminance gradation characteristic to make a maximum gradation corrected luminance level among the gradation corrected luminance levels agree with the maximum luminance level in cases where the maximum luminance level is higher than the standard luminance level and is lower than or equal to the upper limit luminance value of the dynamic range; and setting the corrected luminance gradation characteristic to make a maximum gradation corrected luminance level among the gradation corrected luminance levels agree with the upper limit luminance value of the dynamic range in cases where the maximum luminance level is higher than the upper limit luminance value of the dynamic range.

3. A luminance gradation correcting method according to claim 1 in which the step of detecting a maximum luminance level comprises the steps of:

selecting one or more particular pieces of histogram data respectively having a value not equal to zero from the luminance levels; and detecting the maximum luminance level from one or more luminance levels corresponding to the particular pieces of histogram data.

4. A luminance gradation correcting method according to claim 1 in which the step of detecting a luminance gradation characteristic comprises the steps of:

repeatedly calculating a sum of values of pieces of histogram data as a summed value of a piece of summed histogram data while the number of pieces of histogram data is increased one by one in the order of heightening a luminance level corresponding to one piece of particular histogram data added to the pieces of histogram data; and setting an inclination of a line indicated by the series of summed values of the pieces of summed histogram data, which are arranged in the order of increasing the number of pieces of histogram data corresponding to each piece of summed histogram data, as the luminance gradation characteristic.

5. A luminance gradation correcting method according to claim 1 in which the step of detecting pieces of histogram data comprises the steps of:

detecting pieces of original histogram data respectively indicating the number of pixels of one luminance level from the input picture signal;

preparing a limitation value in cases where the maximum luminance level is lower than or equal to the standard luminance level;

preparing a low limitation value and an upper limitation value higher than the low limitation value in cases where the maximum luminance level is higher than the standard luminance level;

setting the pieces of original histogram data to the pieces of histogram data having values equal to the limitation value in cases where the maximum luminance level is lower than or equal to the standard luminance level;

setting each piece of original histogram data lower than the low limitation value to one piece of histogram data having a value equal to the low limitation value in cases where the maximum luminance level is higher than the standard luminance level;

setting each piece of original histogram data higher than the high limitation value to one piece of histogram data having a value equal to the high limitation value in cases where the maximum luminance level is higher than the standard luminance level; and setting each piece of original histogram data equal to or higher than the low limitation value and equal to or lower than the high limitation value to one piece of histogram data having the same value as that of the piece of original histogram data in cases where the maximum luminance level is higher than the standard luminance level.

6. A luminance gradation correcting method according to claim 1 in which the step of detecting pieces of histogram data includes the steps of:

producing a long-time picture signal indicating the particular image in a long exposure time;

producing a short-time picture signal indicating the particular image in a short exposure time; and combining the long-time picture signal and the short-time picture signal to produce the input picture signal in which an image of a low luminance object is indicated by the long-time picture signal and an image of a high luminance object is indicated by the short-time picture signal.

7. A gradation correction apparatus comprising:

an imaging device which has at least double sampling speed;

a time-axis converter receiving signals of said imaging device;

a synthesizer receiving signals of said time-axis converter and outputting a synthesized image signal;

a histogram detector which detects histogram data of said synthesized image signal input from said synthesizer;

a maximum luminance level detector which detects a maximum luminance level from said histogram data;

a gradation characteristic calculator which calculates a gradation characteristic based on said histogram data;

a corrected gradation characteristic calculator which calculates a corrected gradation characteristic according to said maximum luminance level; and a gradation corrector which corrects a gradation of said synthesized image signal according to said corrected gradation characteristic.

8. The gradation correction apparatus according to claim 7, wherein said imaging device outputs a long exposed image signal and a short exposed image signal in at least said double sampling speed;

said time-axis converter reading out said long exposed image signal and said short exposed image signal in a same time axis; and said synthesizer combining said long exposed signal and said short exposed signal in said synthesized image signal.

9. The gradation correction apparatus of claim 7, wherein said maximum luminance level is the last datum of said histogram data which is not equal to zero when each of said histogram data is compared with zero from lower histogram data.

10. The gradation correction apparatus of claim 7, said corrected gradation characteristic calculator adjusting the minimum luminance level of said corrected gradation characteristic based an said maximum luminance level of said histogram data.

11. The gradation correction apparatus of claim 7, said corrected gradation characteristic calculator adjusting maximum and minimum inclinations of said corrected gradation characteristic based on said maximum luminance level of said histogram data.

12. The gradation correction apparatus of claim 10, further comprising:

a signal processor processing an output signal of said gradation corrector;

said signal processor having a defined dynamic range;

said corrected gradation characteristic calculator adjusting said gradation characteristic by a) setting said corrected gradation characteristic to said gradation characteristic when sad maximum luminance level of said histogram data is lower than a standard luminance level;

b) setting a maximum luminance level of said corrected gradation characteristic to said maximum luminance level of said histogram data when said maximum luminance level of said histogram data is higher than said standard luminance level and is lower than or equal to an upper limit luminance value of said dynamic range of said signal processor; and c) setting said maximum luminance level of said corrected gradation characteristic to said upper limit luminance value of said dynamic range of said signal processor when said maximum luminance level of said histogram data is higher then said upper limit luminance value of said dynamic range of said signal processor.

13. A video camera comprising a gradation correction apparatus, said gradation correction apparatus including:

an image device which has at least double sampling speed;

a time-axis converter;

a synthesizer outputting a synthesized image signal;

a histogram detector which detects histogram data of said synthesized signal input from said synthesizer, said histogram data including a maximum luminance level;

a maximum luminance level detector which detects the maximum luminance level from said histogram data;

a gradation characteristic calculator which calculates a gradation characteristic based on said histogram data;

a corrected gradation characteristic calculator which calculates a corrected gradation characteristic according to said maximum luminance level; and a gradation corrector which corrects a gradation of said synthesized image signal according to said corrected gradation characteristic.

14. A gradation correction method comprising the steps of:

generating a long exposed image signal and a short exposed image signal in at least said double sampling speed;

converting a time-axis of said long exposed image signal and said short exposed image signal in a same time-axis;

synthesizing said long exposed signal and said short exposed signal in a synthesized image signal;

detecting histogram data of said synthesized picture signal;

detecting a maximum luminance level from said histogram data;

calculating a gradation characteristic based on said histogram data;

calculating a corrected gradation characteristic according to said maximum luminance level; and correcting a gradation of said synthesized image signal according to said corrected gradation characteristic.

* * * * *